(12) United States Patent
Mattikalli et al.

(10) Patent No.: US 12,091,180 B2
(45) Date of Patent: Sep. 17, 2024

(54) DEVICE AND METHOD FOR OPERATING A HYBRID-ELECTRIC PROPULSION SYSTEM BY CONTROL OF EQUIPMENT DYNAMICS

(71) Applicant: The Boeing Company, Chicago, IL (US)

(72) Inventors: Raju Shankar Mattikalli, Sammamish, WA (US); Hubert Wong, Huntington Beach, CA (US); Camron R. Call, St. Charles, MO (US); Kamiar J. Karimi, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 388 days.

(21) Appl. No.: 17/556,635

(22) Filed: Dec. 20, 2021

(65) Prior Publication Data

US 2023/0192304 A1 Jun. 22, 2023

(51) Int. Cl.
*B64D 27/24* (2024.01)
*B60W 10/26* (2006.01)
*B64D 27/02* (2006.01)

(52) U.S. Cl.
CPC ............. *B64D 27/24* (2013.01); *B60W 10/26* (2013.01); *B64D 27/026* (2024.01); *B64D 2221/00* (2013.01)

(58) Field of Classification Search
CPC . B60W 10/26; B64D 2221/00; B64D 27/026; B64D 27/24; B64D 31/06
See application file for complete search history.

(56) References Cited

U.S. PATENT DOCUMENTS

| | | | | |
|---|---|---|---|---|
| 5,841,201 A | * | 11/1998 | Tabata | B60W 10/08 290/40 C |
| 5,935,040 A | * | 8/1999 | Tabata | B60W 10/08 903/910 |
| 6,116,363 A | * | 9/2000 | Frank | B60K 6/48 903/917 |
| 10,364,037 B2 | * | 7/2019 | Armstrong | B64D 27/10 |
| 11,001,388 B1 | * | 5/2021 | Parvizian | B64C 29/0025 |

(Continued)

*Primary Examiner* — Babar Sarwar
(74) *Attorney, Agent, or Firm* — Ostrager Chong Flaherty & Broitman P.C.

(57) ABSTRACT

A computer-implemented method for optimally operating a hybrid-electric propulsion system by control of equipment dynamics. Prior to start of a mission, an original energy management plan is generated which is calculated to minimize estimated life-cycle operating costs for the vehicle during the mission. During an initial portion of the mission, operations of first and second power sources, a power distribution system, and a propulsion system are controlled such that a power mixture is supplied to the propulsion system from the first and second power sources in accordance with the original energy management plan. During the initial portion of the mission, a modified energy management plan is generated which is calculated to minimize estimated life-cycle operating costs for the vehicle. During a subsequent portion of the mission, operations of the first and second power sources, power distribution system, and propulsion system are controlled such that a power mixture is supplied to the propulsion system from the first and second power sources in accordance with the modified energy management plan.

17 Claims, 9 Drawing Sheets

(56) References Cited

U.S. PATENT DOCUMENTS

| | | | |
|---|---|---|---|
| 2005/0228553 A1* | 10/2005 | Tryon | B60L 50/16 701/22 |
| 2009/0319110 A1* | 12/2009 | Tani | B60K 6/48 903/930 |
| 2010/0030466 A1* | 2/2010 | Rogers | G01C 21/3415 707/E17.107 |
| 2010/0179714 A1* | 7/2010 | Tani | F02D 41/08 903/903 |
| 2011/0029168 A1* | 2/2011 | Talberg | B60W 20/12 903/903 |
| 2011/0213517 A1* | 9/2011 | Laws | B60L 58/12 180/65.265 |
| 2011/0231034 A1* | 9/2011 | Kinser | B60K 6/46 701/2 |
| 2012/0136517 A1* | 5/2012 | Bauer | B60L 58/40 180/65.265 |
| 2012/0209463 A1* | 8/2012 | Gibbs | B60W 20/40 903/903 |
| 2012/0232728 A1* | 9/2012 | Karimi | H02J 3/38 180/65.265 |
| 2014/0094998 A1* | 4/2014 | Cooper | B61L 15/0036 701/2 |
| 2015/0298680 A1* | 10/2015 | Matthews | B60W 10/08 180/65.265 |
| 2016/0159497 A1* | 6/2016 | Zhou | B64F 1/227 307/9.1 |
| 2016/0214503 A1* | 7/2016 | Orita | B60L 50/66 |
| 2016/0221683 A1* | 8/2016 | Roberts | B64D 27/02 |
| 2016/0368495 A1* | 12/2016 | Luther | B61L 15/0058 |
| 2019/0135264 A1* | 5/2019 | Shin | B60W 20/40 |
| 2019/0325757 A1* | 10/2019 | Goel | G05D 1/102 |
| 2019/0340937 A1* | 11/2019 | Villa | G08G 5/0039 |
| 2020/0021107 A1* | 1/2020 | Collins | B64D 47/00 |
| 2020/0139954 A1* | 5/2020 | Wallstedt | G06F 16/29 |
| 2020/0159221 A1* | 5/2020 | Wu | G06Q 10/08355 |
| 2020/0180771 A1* | 6/2020 | Moore | B64D 27/33 |
| 2020/0398655 A1* | 12/2020 | Li | B60K 6/46 |
| 2021/0254556 A1* | 8/2021 | Asselin | B64D 27/24 |
| 2022/0018906 A1* | 1/2022 | Brown | G08G 1/0125 |
| 2022/0063824 A1* | 3/2022 | Hiett | F01D 15/10 |
| 2022/0129015 A1* | 4/2022 | Ota | B60L 58/14 |
| 2022/0153252 A1* | 5/2022 | Lavertu | B60W 20/12 |
| 2022/0319312 A1* | 10/2022 | Mintz | G06Q 30/0224 |
| 2022/0363238 A1* | 11/2022 | Li | B60W 10/06 |
| 2023/0091929 A1* | 3/2023 | Atreya | B64D 37/30 244/135 R |
| 2023/0124726 A1* | 4/2023 | Pilgrim | B64D 27/10 475/5 |
| 2023/0133959 A1* | 5/2023 | Radzikh | B64D 27/02 60/202 |
| 2023/0139529 A1* | 5/2023 | Baig | B64D 27/14 244/55 |
| 2023/0166758 A1* | 6/2023 | Brandon | B60W 60/00 701/23 |
| 2023/0348081 A1* | 11/2023 | Riediger | B64D 35/00 |
| 2023/0359197 A1* | 11/2023 | Rose | G06V 10/245 |
| 2024/0002066 A1* | 1/2024 | Anderson | B64D 33/08 |

\* cited by examiner

DEVICE AND METHOD FOR OPERATING A HYBRID-ELECTRIC PROPULSION SYSTEM BY CONTROL OF EQUIPMENT DYNAMICS

BACKGROUND

This disclosure generally relates to hybrid-electric and all-electric systems that provide power to connected loads, including a propulsion load for an aircraft or other vehicle.

The application of electric power for aircraft propulsion can take a variety of forms, ranging from hybrid-electric (partially electric) to all-electric (fully electric). One challenge accompanying the variety of forms is the problem of energy management in hybrid-electric and all-electric vehicles, in particular, airplanes. Existing solutions for energy management are piecemeal, meaning that energy management is performed at the level of individual device controllers (such as engine or battery controllers) or individual functions (such as regenerative braking). System-level orchestration is limited, especially orchestration that considers the entire mission or trip. Of the solutions that possess some degree of system-level orchestration (for example, in hybrid cars), very little is done to consider a long time horizon, like the entire mission or trip. This is the main drawback of existing solutions, to wit, the planning horizon is very short. Existing solutions are good for few seconds of a trip, wherein they use the instantaneous state of the vehicle and power devices to make decisions about how to control those devices. Some energy management systems use heuristic rules and statistical methods to perform the energy management function. Tasks of utilizing regenerative braking, maintaining minimum battery state-of-charge, and hybridizing engine and battery power are done using a variety of vehicle state variables in a simple if-then type of heuristic control strategy. In terms of control flow, a decision is made by selectively altering the control flow based on satisfaction of some condition. Another drawback of existing solutions is that longer-term effects, such as ageing and wear that contribute to maintenance and other life-cycle costs, are not considered. In other words, existing solutions do not compute optimal solutions that minimize life-cycle operating costs.

SUMMARY

The subject matter disclosed in some detail below is directed to devices and methods for optimally operating a hybrid-electric propulsion and power system. The device is an energy management control unit that interacts with equipment controllers, such as engine, battery, and power conversion controllers, to orchestrate their operation and optimize life-cycle operating cost of the aircraft. In accordance with one embodiment, the energy management control unit (e.g., a computer) is configured (e.g., programmed) to use models for cost, equipment life degradation, and equipment dynamic performance in an optimization-based scheme to integrate available sources of power. The energy management control unit computes continuously varying levels of contribution by power sources in a way that meets overall vehicle energy demands while maintaining dynamic equipment operating points at levels that extend equipment life.

The devices and methods proposed herein solve the problem of energy management in hybrid-electric vehicles, in particular, airplanes. More specifically, means and methods for orchestrating the unified operation of multiple power sources are disclosed which are applicable to systems having various electrified propulsion architectures. The objective is to prolong the operational life of the system as a whole by increasing the time between service and replacement of system components, thereby driving down operating costs. The energy management technology disclosed herein enables individual components to leverage their characteristic strengths throughout the vehicle mission. Such energy management devices and algorithms are a key factor in enabling the use of hybrid-electric and all-electric propulsion systems, from the point of view of their effective operation and financial competitiveness as compared to conventional combustion engine-based propulsion systems.

The methodology proposed herein has a long-term planning horizon for energy management, planning for the entire mission or trip by taking mission-level targets and conditions into account. Most existing solutions plan a few seconds worth of trip, acting on instantaneous variables such as current road conditions and instantaneous driver commands to compute a strategy for energy management.

The energy management device disclosed herein is configured to determine a control strategy by optimizing lifetime operating costs. Existing solutions mostly optimize short-term vehicle performance. The methodology proposed herein explicitly considers long-term effects such as maintenance costs, replacement costs related to wear, damage and aging, cost of overhaul, cost of consumables such as fuel and electric charge, cost of recycling, etc. to compute a control strategy.

In addition, the methodology proposed herein assumes a concept of operation wherein human input and intent play a significantly minor role in how the energy management control is performed. Most existing solutions assume almost continuous human input.

Lastly, the methodology proposed herein models the inherent operating dynamics of power generating equipment using quantities such as speed, thrust, electrical current, voltage, temperature, etc. Long-term effects such as wear and ageing are related to these dynamic operating parameters. The dynamic models are formulated as systems of algebraic-differential equations in terms of unknown state and control variables. Most existing solutions cannot use and solve such systems of algebraic-differential equations because of the real-time needs of existing solutions.

Although various embodiments of devices and methods for optimally operating a hybrid-electric propulsion and power system will be described in some detail below, one or more of those embodiments may be characterized by one or more of the following aspects.

One aspect of the subject matter disclosed in detail below is a vehicle comprising an energy management control unit, first and second power sources, a propulsion system, and a power distribution system capable of selectively providing power to the propulsion system from one or both of the first and second power sources. The energy management control unit comprises modules capable of executing: an offline optimization routine that is configured to generate an original energy management plan which is calculated to minimize estimated life-cycle operating costs for the vehicle during a mission; and an online routine that is configured to control operations of the first and second power sources, the power distribution system, and the propulsion system in real-time during the mission such that a power mixture is supplied to the propulsion system from the first and second power sources in accordance with the original energy management plan. The offline routine uses models (approximations of reality) to relate quantities such as speed, thrust and power required. Because the models are approximations, when the offline plans are being implemented on an actual flight, some of the assumed relations may not precisely line up with reality. The role of the online routine is to continuously compensate for these deviations between models and reality. The life-cycle operating costs include fuel costs, charging costs, maintenance costs, and replacement costs. Generating an original energy management plan comprises: selecting respective amounts of energy drawn from the first and second power sources to reduce overall operating costs; and choosing equipment operating points that result in a minimum airplane-related operating cost.

In accordance with one embodiment of the vehicle described in the immediately preceding paragraph, the online routine is further configured to perform operations comprising: generating a modified energy management plan which is calculated to minimize estimated life-cycle operating costs for the vehicle; and controlling operations of the first and second power sources, the power distribution system, and the propulsion system during a subsequent portion of the mission such that a power mixture is supplied to the propulsion system from the first and second power sources in accordance with the modified energy management plan.

Another aspect of the subject matter disclosed in detail below is an aircraft hybrid-electric propulsion system comprising: a battery; a battery controller which is configured to control operation of the battery; a turbine; an engine controller which is configured to control operation of the turbine; an electric motor; a motor controller which is electrically coupled to the battery and configured to control operation of the electric motor; a gearbox which is mechanically coupled to the turbine and the electric motor; a fan (propeller) which is mechanically coupled to the gearbox; and an energy management control unit which is communicatively coupled to the battery controller, the engine controller, and the motor controller. The energy management control unit comprises modules capable of executing: an offline optimization routine that is configured to generate an original energy management plan which is calculated to minimize estimated life-cycle operating costs for the vehicle during a mission; and an online routine that is configured to vary a mixture of fuel input to the turbine versus battery power used for driving rotation of the propeller in a manner consistent with the original energy management plan during an initial portion of the mission.

A further aspect of the subject matter disclosed in detail below is a computer-implemented method for optimally operating a hybrid-electric propulsion system by control of equipment dynamics, the method comprising: prior to a start of a mission, generating an original energy management plan which is calculated to minimize estimated life-cycle operating costs for the vehicle during the mission; and during an initial portion of the mission, controlling operations of first and second power sources, a power distribution system, and a propulsion system such that a power mixture is supplied to the propulsion system from the first and second power sources in accordance with the original energy management plan.

In accordance with one embodiment of the computer-implemented method described in the immediately preceding paragraph, the method further comprises: during the initial portion of the mission, generating a modified energy management plan which is calculated to minimize estimated life-cycle operating costs for the vehicle; and during a subsequent portion of the mission, controlling operations of the first and second power sources, the power distribution system, and the propulsion system such that a power mixture is supplied to the propulsion system from the first and second power sources in accordance with the modified energy management plan.

Other aspects of devices and methods for optimally operating a hybrid-electric propulsion and power system are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of devices and methods for optimally operating a hybrid-electric propulsion and power system are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "propulsion load" means a consumer of power for providing propulsive thrust to the aircraft. This is opposed to a power source, such as a battery, which produces power.

Some aircraft have electrically powered propulsion systems (hereinafter "electric aircraft"). In such aircraft, the power source may include battery packs of different types and characteristics, fuel cells or a mix of the sources. Electric motors are used to convert electrical power into mechanical power for use by the propulsion system. For example, an electric motor may turn one or more propellers on the aircraft to provide thrust. An electric aircraft may take various forms. For example, the electric aircraft may be an aircraft, a rotorcraft, a helicopter, a quadcopter, an unmanned aerial vehicle, or some other suitable type of aircraft.

When electric motors are used for propulsion of an aircraft or other vehicle, electrical energy is supplied by a power source. For instance, electrical energy may be supplied by a DC power source that includes a "battery" connected between positive and negative high-voltage direct-current (HVDC) busbars. As used herein, the term "high voltage" in the context of direct current means any DC voltage greater than 270 $V_{DC}$. The battery supplies electrical power to an electric motor that is arranged to convert electrical power into mechanical power for use by the propulsion system of the aircraft or other vehicle.

Some electric propulsion vehicles have a hybrid-electric power architecture (e.g., hybrid-electric aircraft) in which at least two different types of power sources are connected in parallel to a propulsion load. The electrical energy sources will often have different electrical characteristics. For example, the electrical energy sources may be a battery and an electric generator driven by a gas turbine. A gas turbine is a type of internal combustion engine that combusts fuel continuously. The main elements common to all gas turbine engines are an upstream rotating gas compressor, a combustor, and a downstream turbine. The compressor and turbine are mounted on the same shaft.

Figure 1:
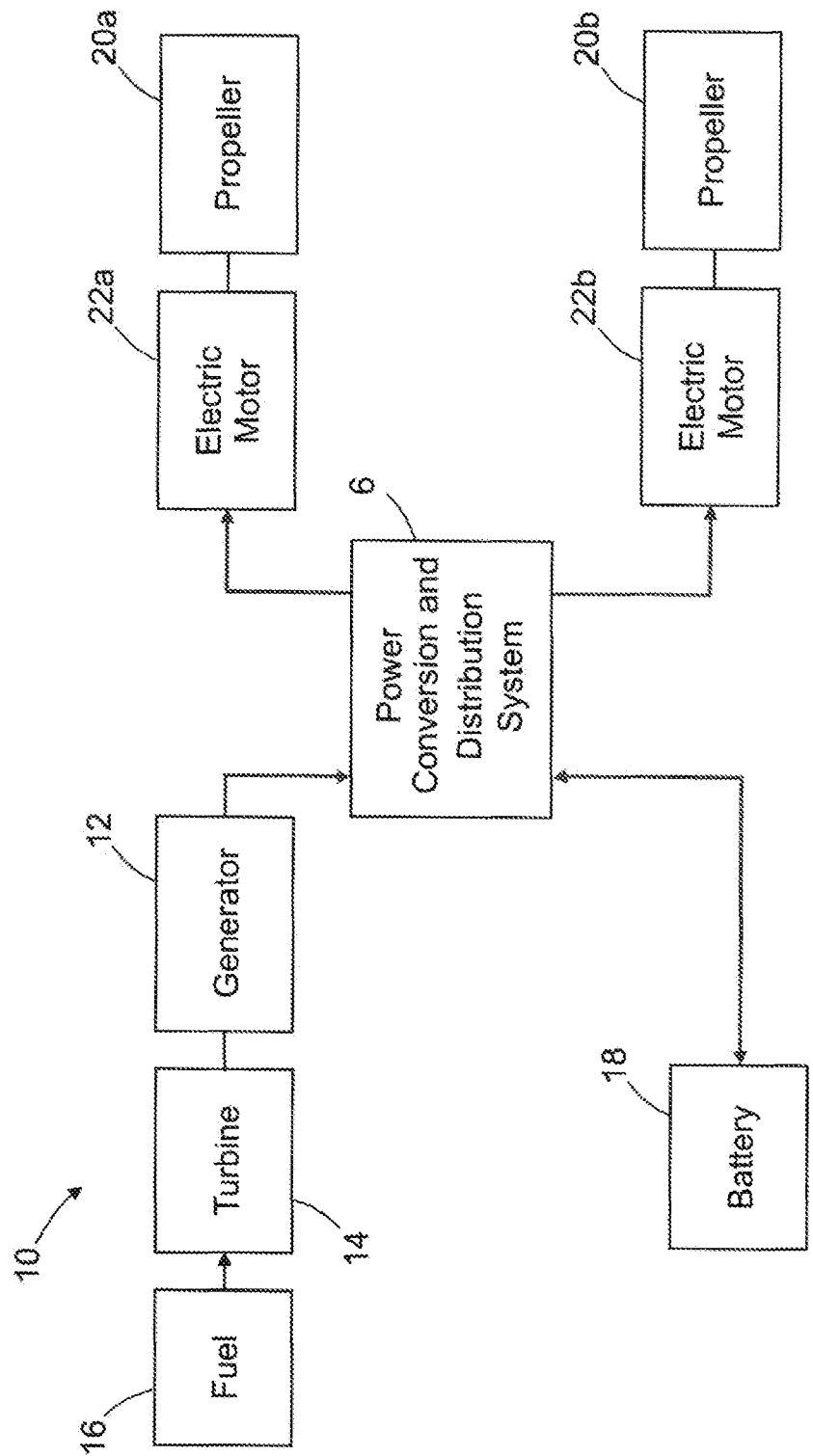
FIG. 1 is a diagram identifying some components of an example hybrid-electric propulsion system having a series hybrid architecture with two power sources.

FIG. 1 is a diagram identifying some components of an example hybrid-electric propulsion system 10 having a series hybrid architecture with two power sources. The hybrid-electric propulsion system 10 includes a pair of propellers 20a and 20b which are mechanically coupled to respective electric motors 22a and 22b. One power source includes a generator 12 and a turbine 14, which are mechanically coupled. More specifically, an output shaft of turbine 14 drives rotation of a rotor of generator 12. The turbine 14 is configured to combust fuel 16. The generator 14 converts mechanical power into electrical power. The other power source includes a battery 18 (or battery system). The hybrid-electric propulsion system 10 further includes a power conversion and distribution system 6 that receives electrical power from either or both of generator 12 and battery 18 and then converts and distributes that power to electric motors 22a and 22b.

The battery 18 typically is in the form of a battery pack consisting of multiple parallel battery strings. Each battery string consists of a respective set of battery modules connected in series. Each of the battery strings further includes respective pluralities of module monitoring units which monitor the state of each battery module. Each of the battery strings supplies DC power to high-voltage busbars via respective string contactors. DC power from the high-voltage busbars is distributed to all high-voltage DC loads.

The battery 18 is connected to the power conversion and distribution system 6 by means of positive and negative high-voltage busbars (not shown in FIG. 1). Each battery string has a dedicated set of string contactors located in the plus and the minus sides to provide galvanic isolation string by string. The battery strings are connected together via the high-voltage busbars when the string contactors are closed. Additionally, a respective dedicated end-point current sensor (e.g., a Hall effect current sensor) is disposed between the string contactor connecting each string to the positive (or negative) high-voltage busbar.

In accordance with one embodiment, the power distribution system 6 includes a power distribution bus and a plurality of disconnect devices (not shown in FIG. 1) on the loads side. Various loads are connected to the power distribution bus via the disconnect devices. The battery 18 is connected to and disconnected from the power distribution system 6 via the aforementioned string contactors, which are driven by respective relays. Power from battery 18 flows into the power distribution bus, which has two rails: positive and negative. On the loads side of the power distribution system 6, there are multiple loads connected via dedicated disconnect devices.

Figure 2:
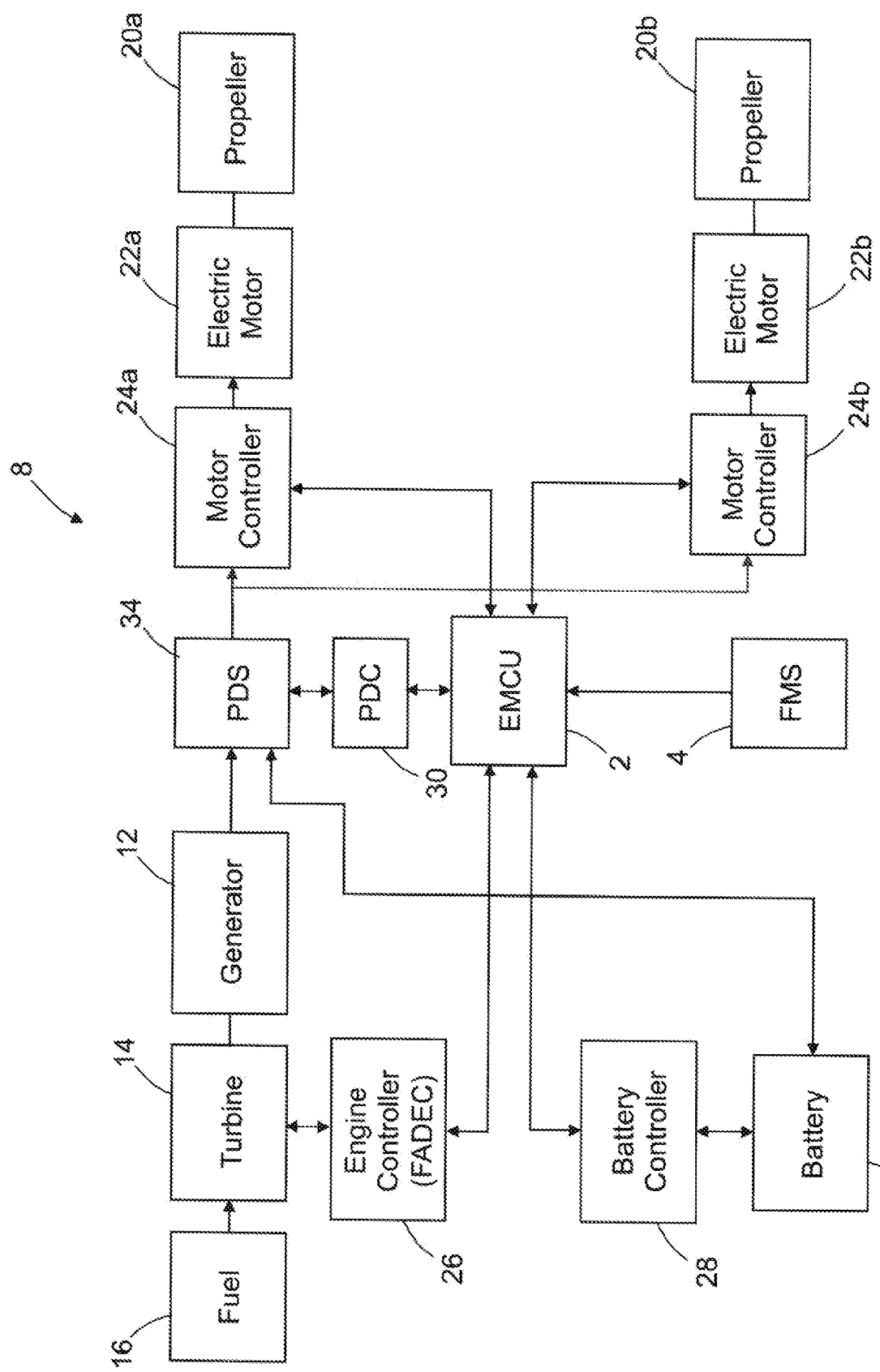
FIG. 2 is a diagram identifying components of an aircraft hybrid-electric propulsion system with a series hybrid architecture that includes an energy management control unit configured to orchestrate (e.g., provide guidance to) multiple device controllers for optimal system operation.

In accordance with the innovative technology proposed herein, the distribution of power in systems having multiple power sources may be augmented by incorporating an energy management control unit (EMCU). FIG. 2 is a diagram identifying components of an aircraft hybrid-electric propulsion system 8 having a series hybrid architecture which includes an EMCU 2 configured to orchestrate (e.g., provide guidance to) multiple device controllers for optimal system operation. The multiple device controllers include the following: an engine controller 26 which controls operation of a turbine 14; a battery controller 28 which controls operation of battery 18, including the states of the string contactors which connect battery strings to busbars; a power distribution controller 30 which controls the states of disconnect devices in a power distribution system 34; a motor controller 24a which controls operation of an electric motor 22a; and a motor controller 24b which controls operation of an electric motor 22b. The hybrid-electric propulsion system 8 further includes a pair of propellers 20a and 20b which are mechanically coupled to electric motors 22a and 22b, as previously described with reference to FIG. 1.

Figure 3:
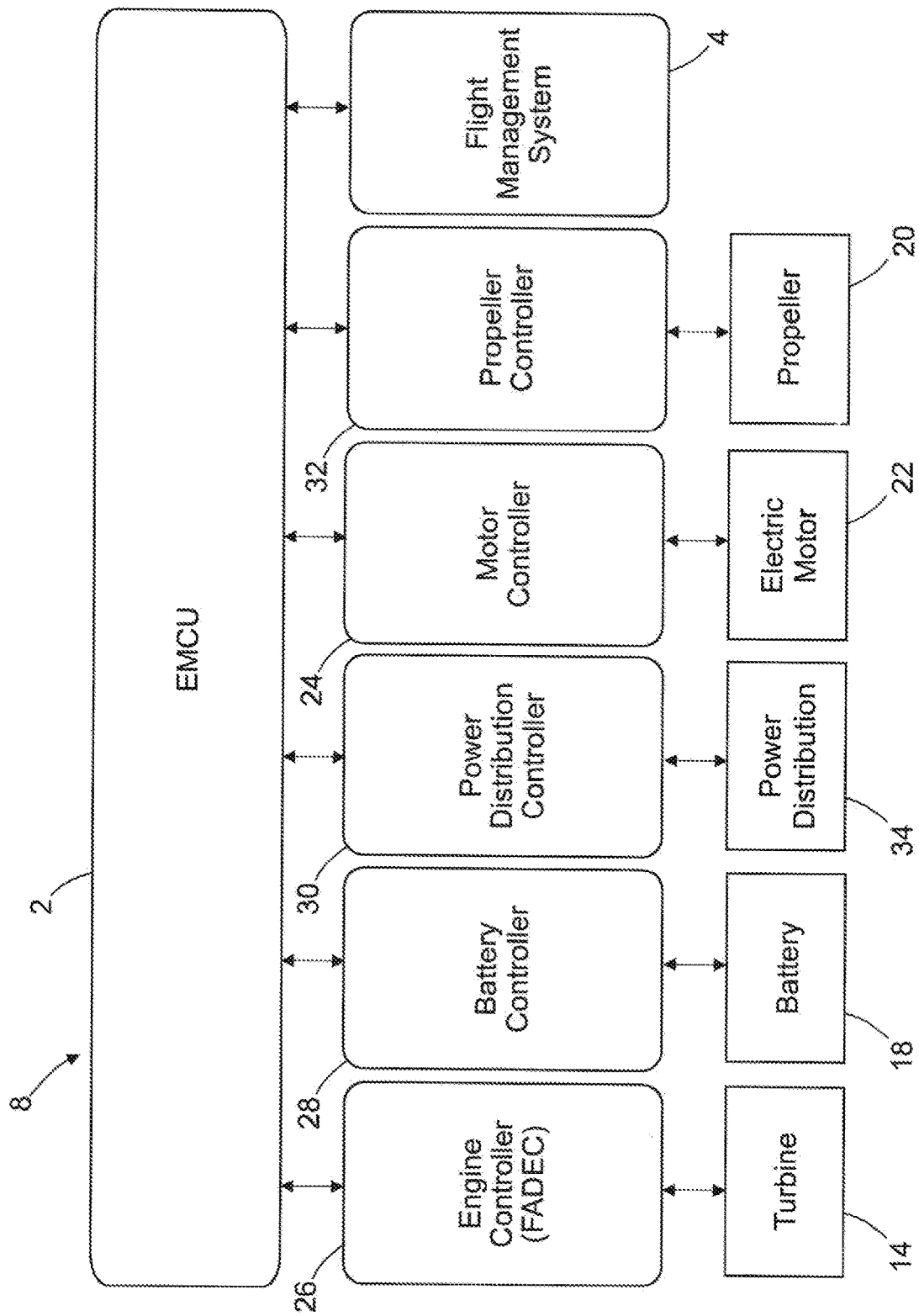
FIG. 3 is a diagram identifying components of an aircraft hybrid-electric propulsion system in accordance with another embodiment that includes an energy management control unit configured to orchestrate (e.g., provide guidance to) multiple device controllers for optimal system operation.

FIG. 3 is a diagram identifying components of an aircraft hybrid-electric propulsion system 8 that includes an EMCU 2 configured to orchestrate (e.g., provide guidance to) multiple device controllers for optimal system operation. The EMCU 2 interacts with the equipment controllers, such as engine controller 26, battery controller 28, power distribution controller 30, propeller controller 32, and motor controllers 24a and 24b, to orchestrate the operations of the system components and optimize life-cycle operating cost of the aircraft. The EMCU 2 is a computer system configured (e.g., programmed) to use models for cost, equipment life degradation, and equipment dynamic performance in an optimization-based scheme to integrate the available sources of power (e.g., generator 12 and battery 18). The EMCU 2 continuously acquires device parameter data from sensors incorporated in the equipment controllers and then computes varying levels of contribution by the power sources in a way that meets overall vehicle energy demands while maintaining dynamic equipment operating points at levels that extend equipment life. The EMCU 2 also receives aircraft parameters (e.g., flight mode, altitude, speed, etc.) from a flight management system 4.

In accordance with some embodiments, the engine controller 26 is a full authority digital engine (or electronics) control (FADEC) system consisting of a digital computer and related accessories that control all aspects of turbine performance. The battery controller 28 (a.k.a. battery management system) is an electronic system configured (e.g., programmed) to control the different positive and negative string contactors depending on the operating mode (charge, discharge, etc.) and provide battery protection (system short-circuit protection, unbalanced string current, etc.). The power distribution controller 30 is configured to control the states of disconnect devices in the power distribution system 34. The motor controllers 24a and 24b include processors and power switches for converting power from the power distribution system 34 to a form required for efficient operation of the electric motors 22a and 22b. The propeller controller 32 is configured to maintain a constant speed of rotation of the propeller 20 by varying the pitch angle of the propeller blades.

The various devices identified in FIG. 3 (turbine 14, battery 18, power distribution system 34, electric motor 22, and propeller 20) include respective sensors for providing device parameters to the associated controllers. The respective controllers send the device parameter data to EMCU 2. Based on the current device parameter data, the EMCU 2 continuously computes varying levels of contributions by the power sources in a way that meets overall vehicle energy demands while maintaining dynamic equipment operating points at levels that extend equipment life. Based on the results of those computations, EMCU 2 generates respective commands to the various controllers which are calculated to optimize the overall life-cycle performance of aircraft hybrid-electric propulsion system 8.

In accordance with one proposed implementation, the battery controller 28 is a battery management system configured to monitor the state of battery 18 as represented by various parameters, such as: total voltage, voltages of individual cells, average temperature, temperatures of individual cells, state of charge (SOC) to indicate the charge level of the battery, state of health (SOH) to indicate the remaining capacity of the battery, state of power (SOP) to indicate the amount of power available for a defined time interval, and other parameters. The battery management system will also control the recharging of the battery. The battery management system may also be configured to manage the battery temperature. The central controller of a battery management system communicates internally with hardware that operates at the cell level. A battery management system may protect its battery by preventing over-current (may be different in charging and discharging modes), over-voltage (during charging), under-voltage (during discharging), over-temperature, under-temperature, ground fault or leakage current detection.

In accordance with one proposed implementation, the motor controllers 24a and 24b include respective DC-to-AC converters which convert DC power from the battery 18 into AC power suitable for powering the electric motors 22a and 22b respectively. In the alternative, electric motors 22a and 22b may utilize AC power derived from the generator 12, which is mechanically coupled to the turbine 14. Each of the motor controllers 24a and 24b include multiple sets of inverters and respective inverter controllers which control the operation of the inverters. An inverter is a power electronic device or circuit that changes direct current to alternating current. In accordance with one proposed implementation, each of the inverters includes a switch system, a set of inductors, a set of capacitors, and an electromagnetic interference filter. The switch system may include different numbers of switches (hereinafter "power switches"), depending on the type of inverter. Each of the power switches may be implemented using, for example, without limitation, a bipolar transistor device, a metal-oxide semiconductor field-effect transistor (MOSFET) device, an insulated-gate bipolar transistor device, or some other type of semiconductor device or switching device.

The electric motors 22a and 22b receive AC power from the inverters via AC power lines. Each electric motor includes a rotor mounted to a shaft and a stator separated from the rotor by an air gap. The stator has a multiplicity of winding groups which are arranged at respective angular positions on the stator. The rotor has a multiplicity of windings, or a permanent magnet array, which windings or permanent magnet array interact with the magnetic field produced by the stator windings to generate the forces that turn the rotor. The electric motor further includes a speed and position sensor which detects the speed of rotation and position of the rotor and sends speed and position signals (not shown in FIG. 2) to the EMCU 2.

The propeller controller 32 may be in the form of a governor which is configured to maintain a constant speed of rotation of the propeller 20 by varying the pitch angle of the propeller blades. Hydraulic governors accomplish this by using a hydraulic valve to control the flow of engine oil through hydraulic mechanisms in the propeller 20. A controller incorporated in the governor is configured to control the flow of engine oil through the hydraulic valve (not shown in the drawings). When a decrease in blade pitch is wanted, the hydraulic valve is opened and a pump (not shown in the drawings) boosts oil pressure to provide quick and positive response by the propeller 20. Depending on its position, the hydraulic valve will direct oil flow to the propeller (increasing pitch), allow flow back from the propeller (decreasing pitch), or take a neutral position with no oil flow (constant pitch) in well-known manner.

The EMCU 2 takes as input dynamic parameters from multiple power devices and issues control signals to guides multiple device controllers for optimal system operation. The EMCU 2 may include multiple processors capable of communicating with a non-transitory tangible computer-readable storage medium arranged to form a computer system which is configured to execute a method to operate the power devices that minimizes life-cycle operating costs of the aircraft as a whole. The EMCU 2 uses models that model the dynamics of the electrical devices and the aircraft. As used herein, the phrase "optimal operation" refers to: (a) selecting the amount of energy drawn from each energy source to reduce overall operating costs; and (b) choosing equipment operating points that result in the minimum airplane-related operating cost. Airplane-related operating costs include: fuel costs, battery charging costs, maintenance costs, and replacement costs.

The EMCU 2 is a real-time control system that is configured (programmed) to perform multiple functions. In accordance with one proposed implementation, the following operations are performed:

(1) The EMCU 2 orchestrates the distribution of a continuously varying mixture of power from the various onboard power sources to various loads.

(2) The algorithm that determines the power mixture uses metrics such as cost (e.g., using a metric called "Cash Airplane Related Operating Cost" (CAROC)) to compare the cost of each flight), noise, and pollution as objective functions.

(3) The EMCU 2 communicates with the device controllers identified in FIG. 3.

(4) The EMCU 2 is configured to ensure that the energy-producing devices (i.e., power sources) operate within safe envelopes by computing control signals that ensure values of device parameters remain within known safe ranges. This is made possible by use of dynamic models of device performance.

(5) The EMCU 2 is designed to be fault-tolerant in its communication and computing functions.

(6) The EMCU 2 includes both offline (planning) and online (reactive) modules (described in some detail below). The offline planning occurs prior to the airplane starting to move. The offline plan is computed just like a flight plan is computed before the airplane leaves the gate.

(7) The EMCU 2 computes the power mixture in conjunction with flight trajectory plan received from the flight management system 4. The EMCU 2 uses the flight trajectory plan to compute an appropriate power mixture to accomplish the planned trajectory.

(8) The EMCU 2 accepts pilot commands relating to the flight trajectory and power-mixture adjustments.

(9) The EMCU 2 monitors the performance of the energy sources, optimizes that performance, and reports problems (e.g., system failures and component malfunctions) to the pilot.

(10) The EMCU 2 adapts to real-time changes, such as a system failure, by updating its models (robustness).

(11) The EMCU 2 communicates and coordinates with the flight management system to predict the future states and performance of the energy sources.

(12) The EMCU 2 adapts to error messaging from device managers such as the battery management system and engine controller.

The energy management controller proposed herein differs from previous energy management controllers found in hybrid-electric cars, locomotives, and ships in the following respects: (1) Current energy management controllers typically take a short-term view of the planning horizon (a few seconds to a portion of a single trip); the energy management controller proposed herein considers hundreds of trips over the lifetime of an airplane. (2) Current energy management controllers typically address only the power requirements of the vehicle and short-term performance. The energy management controller proposed herein includes vehicle power requirements, but takes mission level performance and lifetime operating costs into account. (3) Energy management controllers in automobiles are designed to receive almost continuous human input; in contrast, the concepts of operations for the energy management controller proposed herein assumes sporadic human input, which is common for airplanes.

More specifically, the energy management controller proposed herein includes mathematical models of the power and load devices and of the airplane dynamics. The models take into account device parameters which identify relevant physical quantities whose values play a role in the operating cost of an airplane. For examples, the temperature of an engine is known to influence maintenance costs, whereas battery quantities such as battery current, battery state-of-charge, battery temperature, and battery voltage are device parameters which influence battery life. Some of these quantities define the state of the system (state variables); others define control inputs to the power equipment. The equipment is instrumented to collect the state variables and feed these values to the energy management controller. In addition, energy management controller proposed herein relies on models of the dynamics of these physical quantities, i.e., the variation of these parameters over time.

In accordance with one proposed implementation, the energy management controller proposed herein employs dynamic models expressed by the following equations:

$$\dot{h} = v \sin\gamma \tag{1}$$

$$\dot{r} = v \cos\gamma \tag{2}$$

$$\dot{v} = (1/m)(T - D) - g\sin\gamma \tag{3}$$

$$\dot{\gamma} = (1/v)[(L/m) - g\cos\gamma] \tag{4}$$

$$\dot{w} = w_d \tag{5}$$

$$T = m_e d_T(M, h, \tau)\delta \tag{6}$$

$$w_d = m_e d_w(d_T, M, h) \tag{7}$$

$$L = C_L q S_A \tag{8}$$

$$C_D = d_a(C_L, M) + d_R(w, h) + d_0 \tag{9}$$

$$D = C_D q S_A \tag{10}$$

$$\delta = (p/p_0) \tag{11}$$

$$q = \frac{1}{2}\rho v^2 \tag{12}$$

$$M = v/v_c \tag{13}$$

$$\dot{U}_{Th} = \frac{-U_{Th}}{R_{Th} C_{Th}} + \frac{I_L}{C_{Th}} \tag{14}$$

$$\dot{S} = \frac{-I_L}{Q_{max}} \tag{15}$$

$$\dot{T}_{batt} = (1 - \eta_{cell}) \frac{I_L U_L}{m_{cell} C p_{cell}} \tag{16}$$

$$U_L = U_{oc} - U_{Th} - I_L R_{oc} \tag{17}$$

$$I_{pack} = I_L \cdot n_{parallel} \tag{18}$$

$$U_{pack} = U_L \cdot n_{series} \tag{19}$$

$$P_{out\_bat} = I_{pack} \cdot U_{pack} \tag{20}$$

$$P_{shaft} = \frac{Tv}{\eta_{prop}} \tag{21}$$

$$P_{shaft} = \eta_{motor} P_{in-motor} \tag{22}$$

$$P_{out\_eng} = \eta_{eng} P_{fuel} \tag{23}$$

$$P_{fuel} = -E w_d \tag{24}$$

$$P_{in-motor} = P_{out\_eng} + P_{out\_bat} \tag{25}$$

where h is altitude; r is range; v is velocity; y is flight path angle; w is weight; L is lift; $C_L$ is lift coefficient; p is atmospheric density; D is drag; $C_D$ is drag coefficient; T is thrust; p is atmospheric pressure; δ is pressure ratio; $m_e$ is number of engines; M is Mach number; $S_A$ is reference area; q is dynamic pressure; τ is temperature; $U_{Th}$ is Thevenin voltage; $C_{Th}$ is Thevenin capacitance; $R_{Th}$ is Thevenin resistance; $U_L$ is line voltage; $I_L$ is line current; $U_{oc}$ is open-circuit voltage; $R_{oc}$ is open-circuit resistance; S is state of charge; $T_{batt}$ is battery temperature; $P_{out\_bat}$ is battery power; $P_{out\_eng}$ is engine power; $Q_{max}$ is capacity of one cell; $n_{series}$ is number of cells in series; $n_{parallel}$ is number of cells in parallel; $m_{cell}$ is number of cells; $Cp_{cell}$ is specific heat of one cell at constant pressure; $P_{fuel}$ is fuel power; $P_{shaft}$ is shaft power (for propeller and motor respectively); $P_{in\text{-}motor}$ is motor input power; $P_{out\_eng}$ is engine output power; $\eta_{prop}$ S propeller efficiency; $\eta_{eng}$ is engine efficiency; $\eta_{motor}$ is motor efficiency; $d_T(m, h, \tau)$ is engine thrust; $d_w(d_T, M, h)$ is weight flow; $d_a(C_L, M)$ is drag performance; and $d_R(w, h)$ is Reynolds number correction. These dynamic models are used to formulate and solve an optimal control problem. The result is a set of control values for the different power sources over time.

Optimal control deals with the problem of finding a control law for a given system such that a certain optimality criterion is achieved. A control problem includes a cost function that is a function of state and control variables. An optimal control is a set of differential equations describing the paths of the control variables that minimize the cost function.

The energy management controller proposed herein use life-cycle airplane operating costs as the cost function. The operating costs include the costs of operating and maintaining an airplane, including costs associated with the procurement of replacement parts and resale/disposal of discarded parts, over the life of the airplane. Cost contributors include: capital costs—including financing, depreciation, and insurance; and cash expenditures—including maintenance, fuel, crew, landing, and ground handling.

Traditional life-cycle cost models are created for estimating and forecasting preliminary project costs, and not to optimize operations. Such traditional models use historical cost data, when available. Otherwise, they use surrogate parameters such as equipment weight, life, replacement cost, resale value, and recycling cost The cost models employed by the energy management controller proposed herein are different. The system design still aims to capture cost contributors such as maintenance, fuel, depreciation, etc. However, in order to optimize operations, the models of cost contributors used by the energy management controller proposed herein are expressed in terms of operating parameters (such as: maximum allowed engine temperature and rpm; maximum allowed battery current draw; minimum and maximum allowed battery state of charge; and minimum and maximum battery operating temperatures), as well as operating variables (values that change during each flight, such as: total fuel consumption; average temperature of the gas turbine; and average temperature, current, and state of charge of the battery). The cost function may change over time, as equipment efficiency and other equipment parameters are updated based on actual data.

Figure 4:
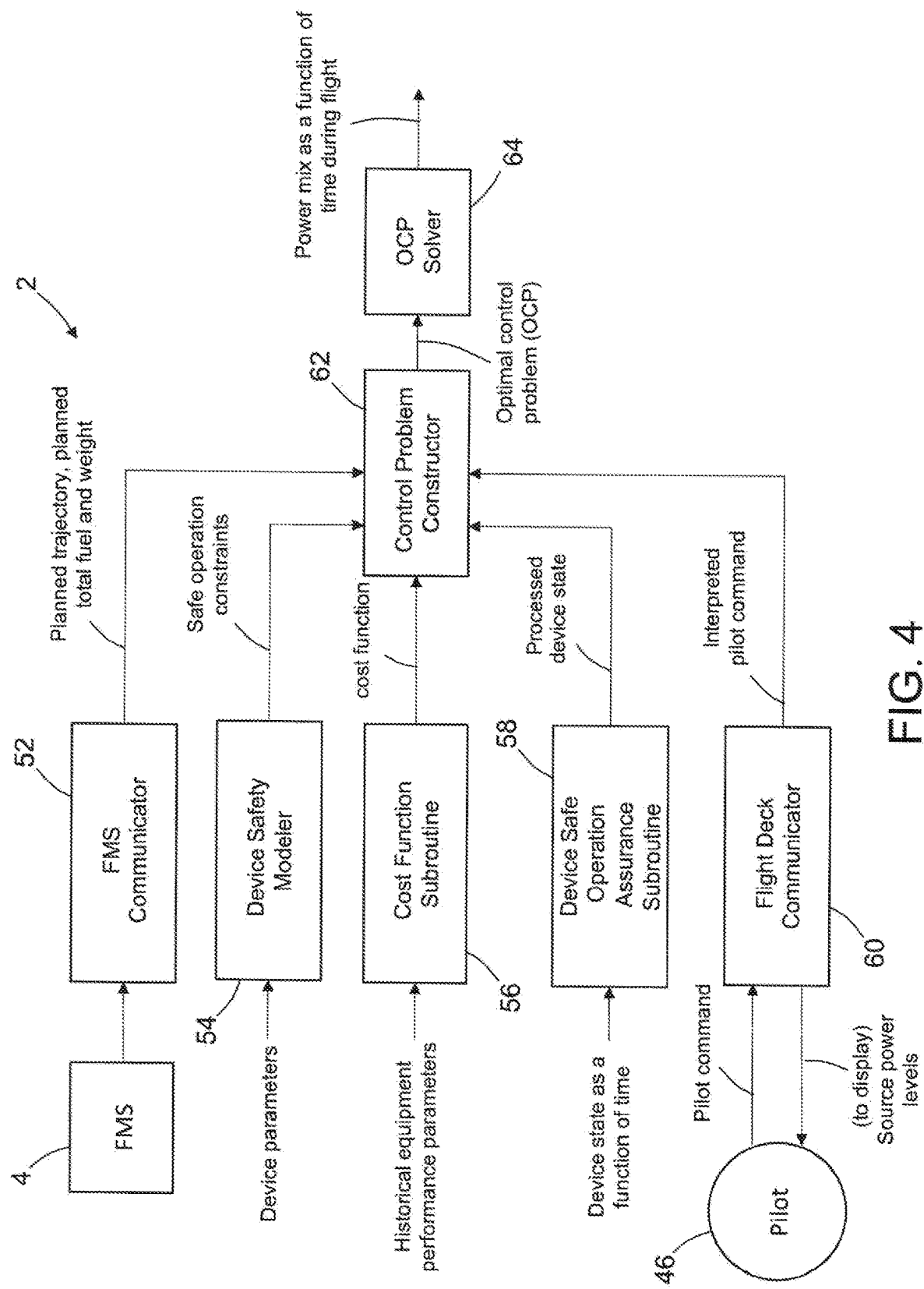
FIG. 4 is a flowchart identifying various modules of the energy management control unit, which modules are configured to execute respective subroutines of an optimization routine in accordance with one embodiment.

FIG. 4 is a flowchart identifying various modules of an EMCU 2, which modules are configured to execute respective subroutines of an optimization routine in accordance with one embodiment. The modules of EMCU 2 include a control problem constructor 62, which is configured to construct an optimal control problem, and an optimal control problem solver 64, which is configured to solve the optimal control problem constructed by control problem constructor 62. The optimal control problem includes a cost function. As shown in FIG. 4, the EMCU 2 also includes a cost function module 56 that is configured to construct the cost function and then upload the cost function to the control problem constructor 62. The cost function is a function of state and control variables (hereinafter referred to collectively as "operating variables"). In accordance with one proposed implementation, the cost function is a mathematical expression designed to calculate life-cycle airplane operating costs. The control problem constructor 62 also takes into account safe operation constraints provided by a device safety modeler 54 when constructing the optimal control problem. The device safety modeler 54 is a processor configured to retrieve device parameters from a non-transitory tangible computer-readable storage medium (not shown in FIG. 4), determine (i.e., model) safe operating limits for each device and the airplane, and then upload constraints on variables to the control problem constructor 62. Each of the control problem constructor 62, optimal control problem solver 64, cost function module 56, and device safety modeler 54 may be a module consisting of a respective processor programmed to process information.

The EMCU 2 further includes a flight management system communicator 52. The flight management system communicator 52 is a communication device configured to receive flight data from a flight management system 4 and then forward that flight data to control problem constructor 62. For example, the flight data may include a planned trajectory and planned total fuel and weight of the airplane, which is taken into account by the control problem constructor 62 when constructing the optimal control problem.

The local non-transitory tangible computer-readable storage medium of control problem constructor 62 stores computer-executable code representing a collection of differential and algebraic equations from dynamic equipment and airplane models. The processor of control problem constructor 62 is programmed to construct an optimal control problem that includes a cost function. The optimal control problem is a set of differential equations describing the paths of control variables which will minimize the cost function. The control problem constructor 62 uploads the optimal control problem to the optimal control problem solver 64. The optimal control problem solver 64 is configured to generate an energy management plan by solving the optimal control problem. The energy management plan includes the power mixture as a function of time during flight.

The cost function is a mathematical expression written in terms of operating variables (i.e., state and control variables in the optimal control problem). These state and control variables are the unknown quantities that are calculated when the optimal control problem is solved. The mathematical expression may also have coefficients which remain constant and are known when solving the optimal control problem. These known values are parameters in the cost function that is delivered to the control problem constructor 62. These parameters are obtained from historical data on equipment performance. The coefficients are computed by the cost function module 56, passed to the control problem constructor 62, and included as part of the optimal control problem.

More specifically, the control problem constructor 62 is configured to compile computer-executable code representing the optimal control problem to be solved and then send that code to the optimal control problem solver 64. The optimal control problem solver 64 is configured to perform iterations of an optimization algorithm until an optimized energy management plan has been derived. The energy management plan output by optimal control problem solver 64 is uploaded to a processor (not shown in FIG. 4) that is programmed with an online routine that is configured to control operations of the various devices in a manner which implements the energy management plan.

Figure 5:
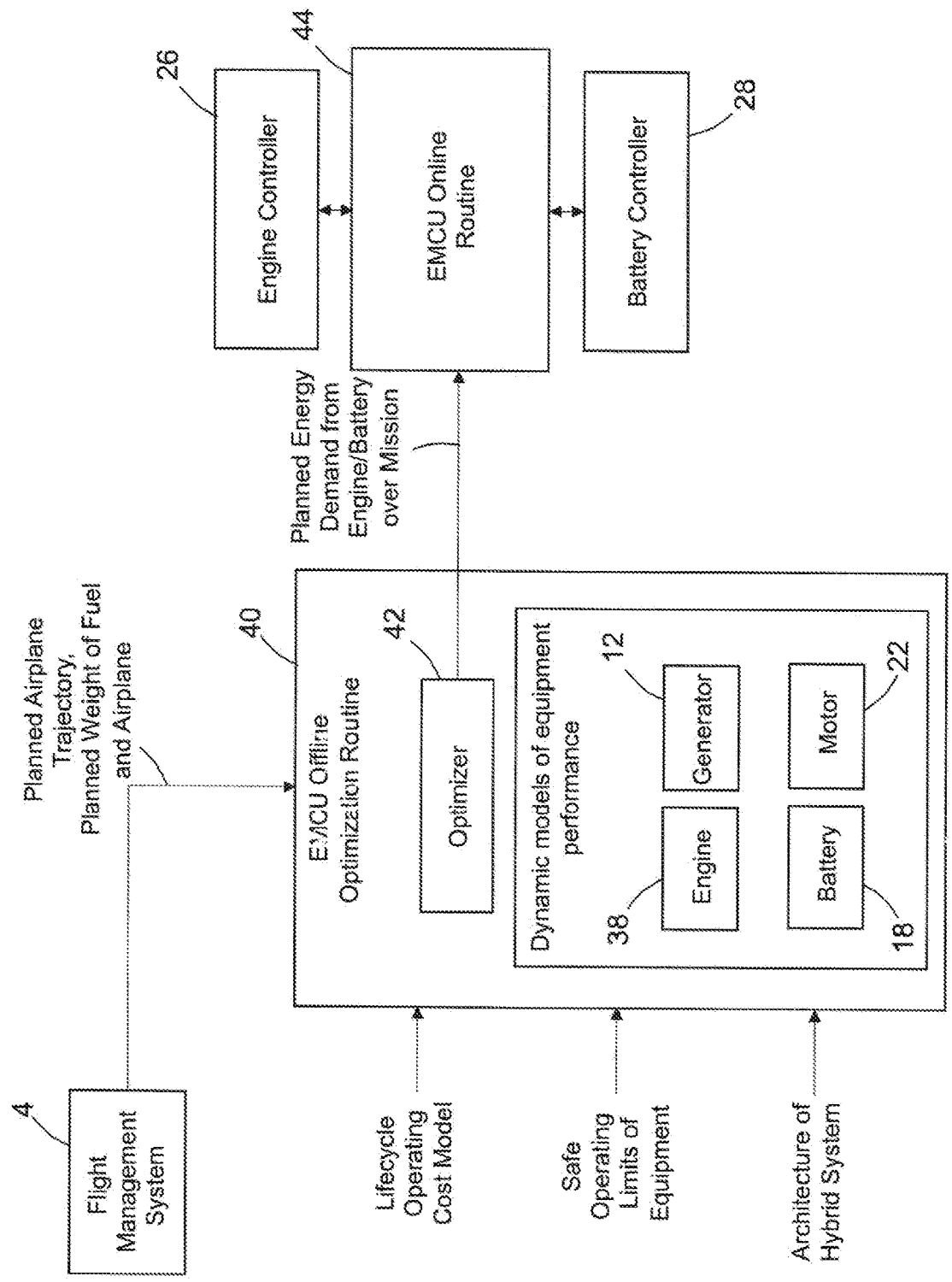
FIG. 5 is a flowchart identifying components of an aircraft hybrid-electric propulsion system that includes an energy management control unit that is configured (programmed) with the capability to execute an offline optimization routine for planning and an online routine for operational control in accordance with one embodiment.

In accordance with one embodiment, EMCU 2 is configured (programmed) with the capability to execute an offline optimization routine for planning and an online routine for operational control in accordance with an original energy management plan. FIG. 5 is a flowchart identifying components of an aircraft hybrid-electric propulsion system that includes an EMCU 2 that has the capability to execute an offline optimization routine 40 for planning and an online routine 44 for operational control in accordance with one embodiment. The offline optimization routine 40 executes before each flight or mission. The offline optimization routine 40 is executed by an optimizer module 42 (part of EMCU 2). The offline optimization routine 40 includes an optimal control algorithm that is configured to generate an original energy management plan designed to optimize operation of the power and propulsion equipment during the mission. More specifically, offline optimization routine 40 identified in FIG. 5 includes respective subroutines which embody the flight management system communicator 52, device safety modeler 54, cost function module 56, control problem constructor 62, and optimal control problem solver 64 identified in FIG. 4.

In accordance with one proposed implementation, the offline optimization routine 40 utilizes information received from the flight management system 4, including the planned airplane trajectory and the planned weights of the fuel and the airplane. The offline optimization routine 40 also utilizes information retrieved from a non-transitory tangible computer-readable storage medium (not identified in FIG. 5), including a life-cycle operating cost model which takes into account wear and ageing (available from device manufacturers and airplane operators), safe operating limits (operating parameters) of the equipment (available from device manufacturers), and information characterizing the architecture of the hybrid system (e.g., series hybrid or parallel hybrid). In addition, the offline optimization routine 40 utilizes dynamic models of the performance of the equipment (such as generator 12, battery 18, motor 22, and engine 38) and airplane, obtained from technical specifications of devices and airplanes. For each iteration of the optimal control algorithm, the estimated operating costs are calculated based on the dynamic models and the mission requirements.

Upon completion of the optimization process, the optimizer module 42 outputs an energy management plan to the online routine 44. For example, the energy management plan may specify the planned energy demand from the engine 38 and battery 18 identified in FIG. 2 over the course of the mission. During flight of the airplane, the online routine 44 processes sensor data received from the engine controller 26 and the battery controller 28, which sensor data represents the current operating variables of the engine 38 and battery 18. The online routine 44 is further configured to adjust the operating points of engine 38 and battery 18 in real-time in a manner consistent with the optimized energy management plan.

Figure 6:
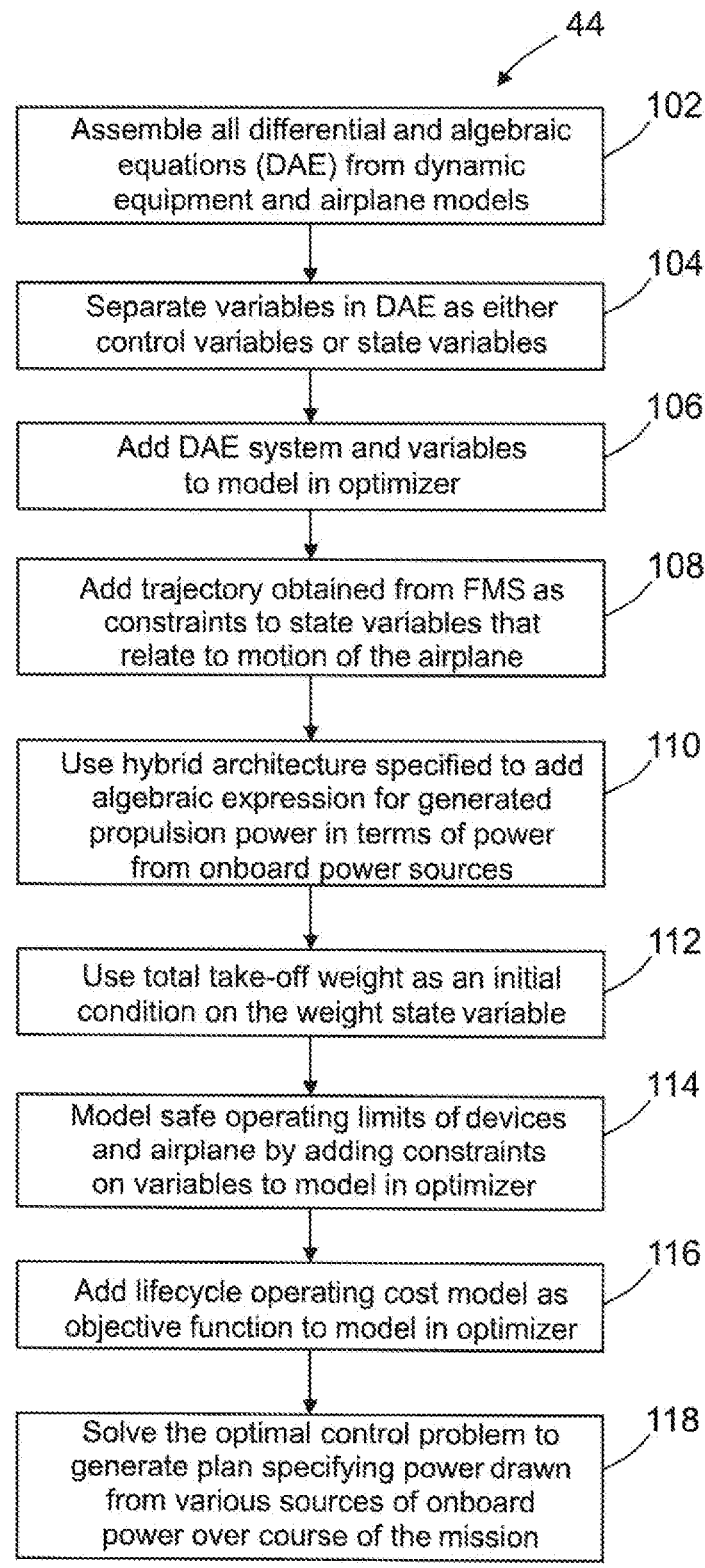
FIG. 6 is a flowchart identifying steps of an offline optimization routine in accordance with one proposed implementation.

FIG. 6 is a flowchart identifying steps of the offline optimization routine 44 in accordance with one proposed implementation. First, the system operator assembles all differential and algebraic equations from the model of the airplane assigned to carry out the mission and the models of the dynamic equipment onboard that airplane (step 102). The variables in the equations are categorized as either control variables or state variables (step 104). The equations and variables are then added to the model in the optimizer (step 106). In addition, the flight trajectory parameters obtained from the flight management system are added as constraints to the state variables that relate to motion of the airplane (step 108). Then the specified hybrid architecture is used to add an algebraic expression for generated propulsion power in terms of power from onboard power sources, e.g., a gas turbine and a battery (step 110). The total take-off weight is added as an initial condition of the weight state variable (step 112). Then safe operating limits of the devices and airplane are modeled by adding constraints on variables to the model in the optimizer (step 114). The life-cycle operating cost model is then added as the objective function to the model in the optimizer (step 116). Then the optimal control problem is solved to obtain the power to be drawn from various sources of onboard power over the course of the mission (step 118).

At least initially, the online routine 44 controls the mixture of power to be provided to the propulsion system during flight in accordance with the energy management plan generated offline. Optionally, a subsequent optimization routine may be performed during flight (hereinafter "in-flight optimization"). In accordance with this option, the online routine 44 is configured to adjust the energy management plan in response to deviations in operating conditions (between as-modeled conditions for offline planning and as-is operating conditions) during flight and then control the mixture of power in accordance with that adjusted energy management plan.

More specifically, a modified version of control problem constructor 62 (described below with reference to FIG. 7) may be included in the online routine 44 (see FIG. 5) that takes into account the current (actual) trajectory and current (actual) fuel weight rather than the planned trajectory and initial fuel weight. Data representing the current trajectory and fuel weight are periodically received from the flight management system 2 during flight. In addition, the modules depicted in FIG. 4 further include a device safe operation assurance module 58 and a flight deck communicator 60, which also provide inputs to the modified version of control problem constructor 62. The device safe operation assurance module 58 is configured to communicate with other controllers, such as the battery controller and engine controller, to ensure that energy devices operate within safe envelopes. More specifically, the device safe operation assurance module 58 monitors the performances of the devices as a function of time, processes the device states to determine whether any operating parameters have been exceeded, and then outputs the processed device states to the modified version of control problem constructor 62. The flight deck communicator 60 is configured to receive pilot commands on trajectory and power-mixture adjustments from a pilot 46, interpret the pilot commands, and then send the interpreted pilot commands to the modified version of control problem constructor 62. In return, the flight deck communicator 60 is further configured to send the measured source power levels to the flight deck for display.

Figure 7:
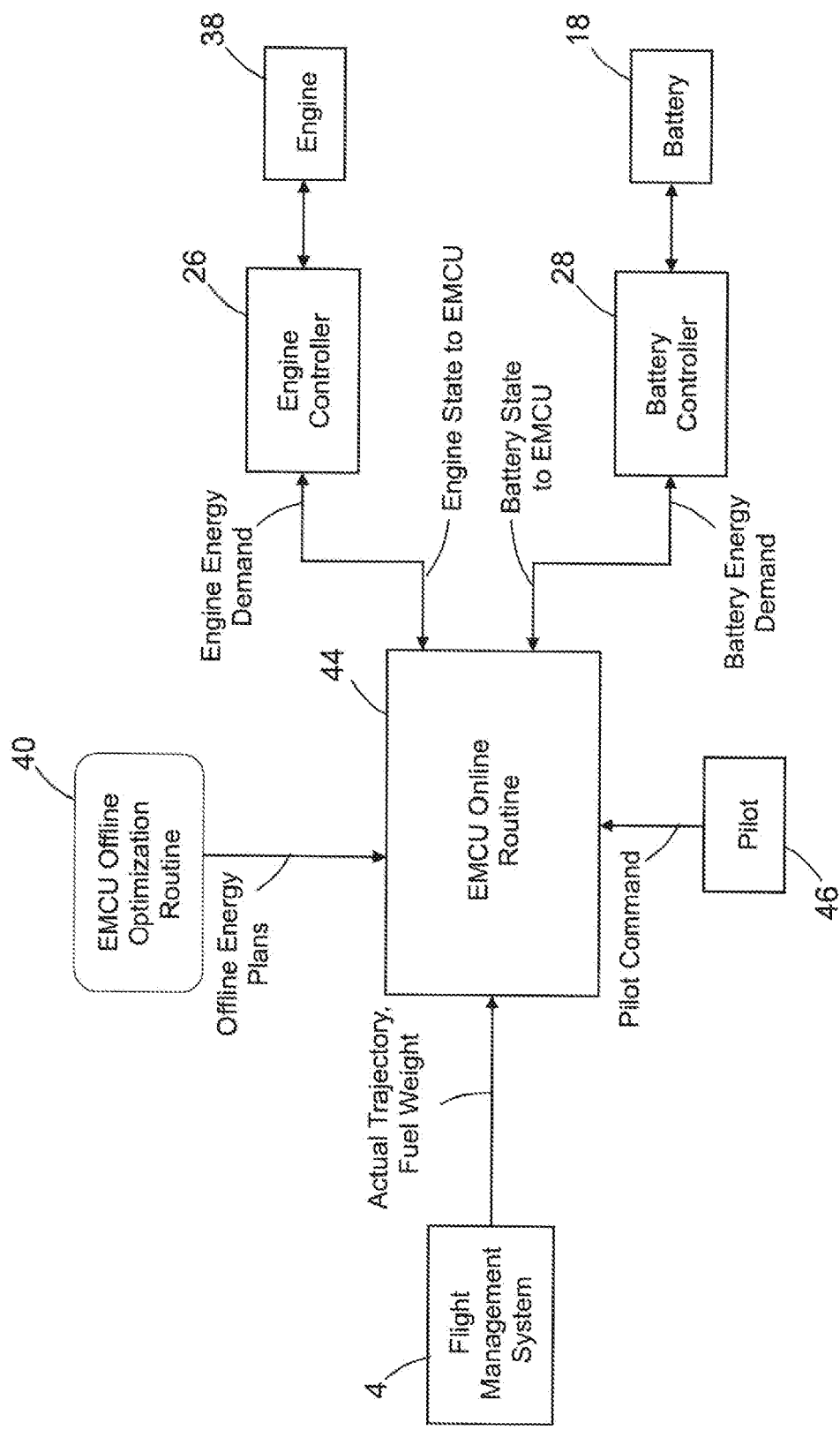
FIG. 7 is a flowchart identifying inputs to and outputs from an online routine of the energy management control unit in accordance with an embodiment in which the offline-generated energy management plan is adjusted during flight.

FIG. 7 is a flowchart identifying inputs to and outputs from an online routine 44 of the EMCU 2 in which the original energy management plan generated by offline optimization routine 40 is adjusted during flight (hereinafter "modified energy management plan"). The EMCU 2 includes one or more processors that are programmed to execute subroutines which process information that is used to generate a modified energy management plan. The modified energy management plan includes a power mixture that varies as a function of time over the course of the mission and is based on expected airplane operating conditions and estimated future energy demand. The online routine 44 monitors the states of the power sources, which in the example depicted in FIG. 7, include an engine 38 (e.g., a gas turbine) and a battery 18. The EMCU 2 receives data representing the state of the battery 18 from the battery controller 28 and data representing the state of the engine 38 from the engine controller 26. The online routine 44 also receives real-time pilot commands from a pilot 46. The online routine 44 uses the offline plan as its reference for how much energy each of the two power sources should contribute. However, because of deviations in parameters (aerodynamic, atmospheric, etc.) between the offline optimization routine 40 and online reality, the online routine 44 may need to modify the power demands sent to engine controller 26 and battery controller 28. The other source of deviation from the offline plan is the pilot input.

In the first step of the process depicted in FIG. 7, the online routine 44 samples the current state of the system and queries input values. More specifically, information indicating the actual state of the system at some time $t=t_1$ is acquired and then the online routine 44 plans for rest of the mission from time $t_1$ to $t_f$, where $t_f$ is the expected time when the mission will conclude. The state information which is processed includes altitude, Mach number, battery state, distance remaining, future thrust demand, current thrust settings commanded by the pilot 46, and the flight trajectory calculated by the flight management system 4. Given the trajectory planned at time $t_1$, planned phases remaining, and state of the battery, the online routine 44 calculates the optimal power to be drawn from various energy sources for the rest of the mission. This calculation is similar to the offline method, but is reduced in complexity to enable optimized calculation in real time (<10 seconds per result). At time t, EMCU 2 sends a computed engine power and a computed battery power to engine controller 26 and battery controller 28 respectively. Each controller is configured to provide the commanded power to the output shaft within operability and safety constraints. These constraints are device specific and known to the controllers. If the controller cannot provide the commanded power, the controller will communicate the actual power that is possible back to the EMCU 2. With a few iterations between EMCU 2 and the controllers, the commanded values are made to converge to the values that are possible based on safety and operability constraints. These converged values are now applied to the system. As the system evolves to a new time $t_2$, the algorithm returns to the first step with time t set to $t_2$ and then performs the next iteration of the above-described steps.

Figure 8:
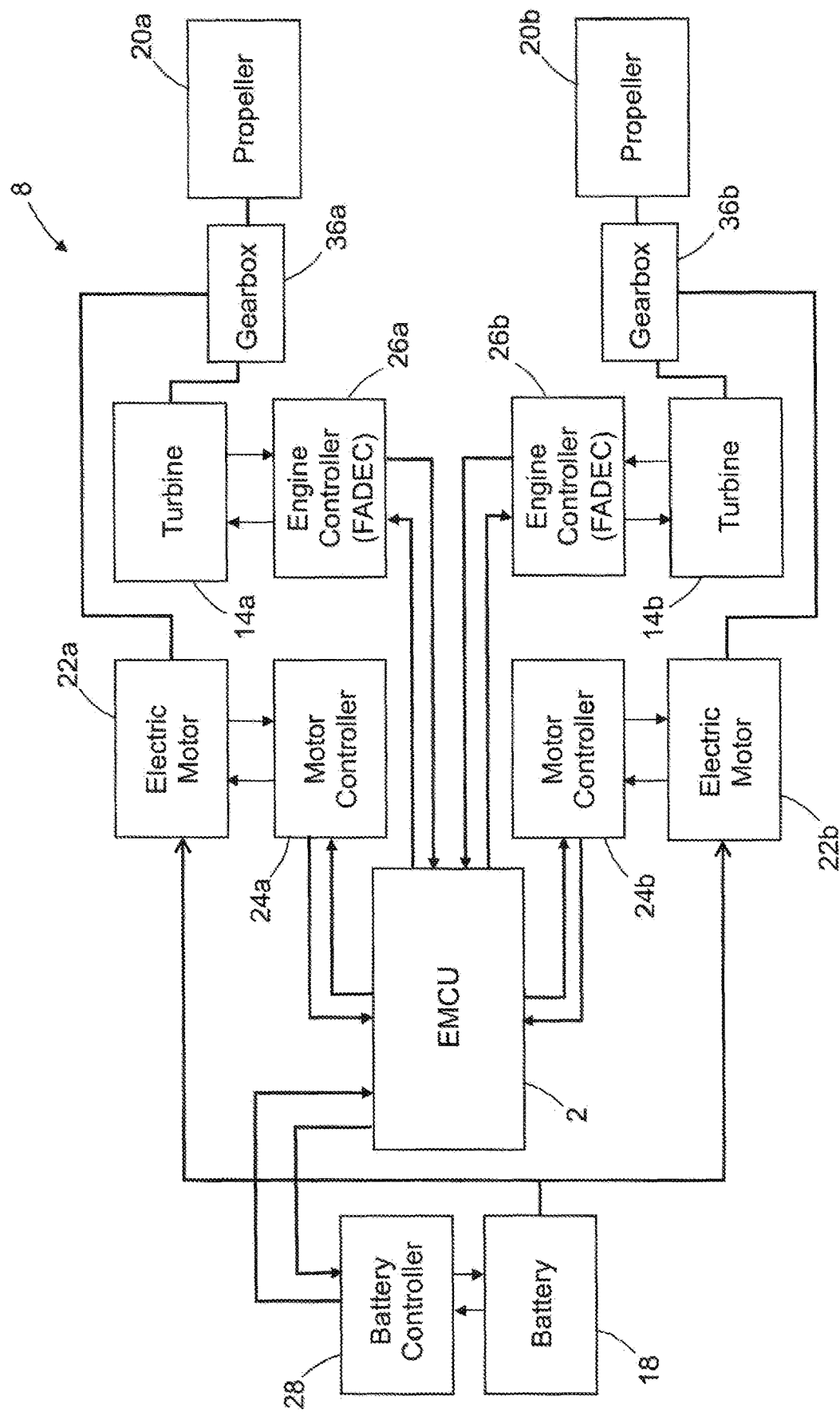
FIG. 8 is a diagram identifying components of an aircraft hybrid-electric propulsion system with a parallel hybrid architecture that includes an energy management control unit configured to guide the propulsion and power controllers for optimal system operation.
Figure 9:
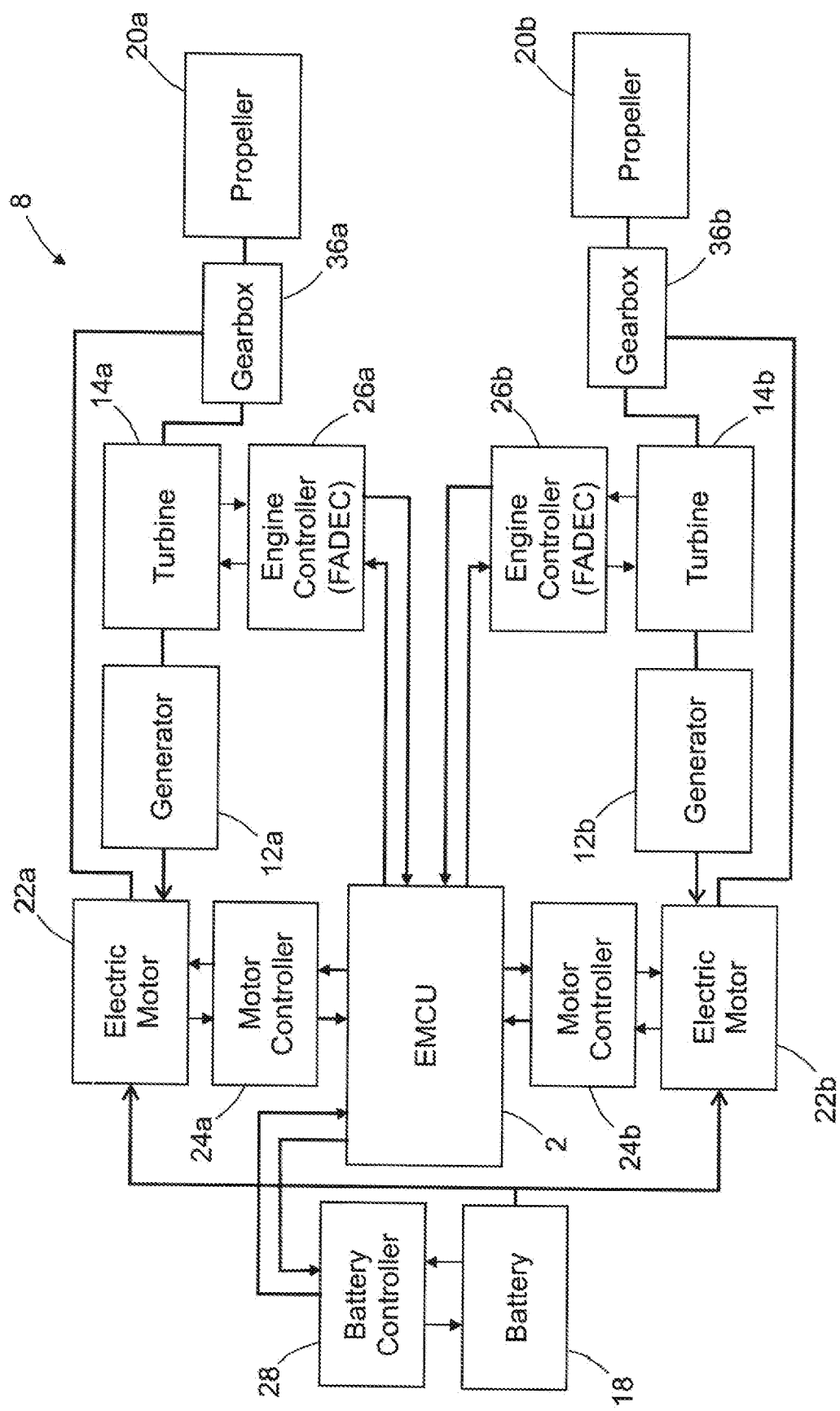
FIG. 9 is a diagram identifying components of an aircraft hybrid-electric propulsion system with a series-parallel hybrid architecture that includes an energy management control unit configured to guide the propulsion and power controllers for optimal system operation.

The technology proposed herein is applicable to hybrid-electric propulsion architectures, including the example series hybrid-electric propulsion architecture depicted in FIG. 2 (described above) and the example parallel and series-parallel hybrid-electric architectures depicted in FIGS. 8 and 9. In FIGS. 8 and 9, the arrows emanating from power sources indicate electrical power links, the arrows emanating from the EMCU 2 indicate electrical control signals, and the arrows emanating from the engine, battery, and motor controllers indicate electrical signals representing device parameters. The lines without arrowheads indicate mechanical links. In addition, although not shown in FIGS. 8 and 9, it should be appreciated that the electric power provided to the engine controllers may pass through a power distribution system and then through the associated motor controllers (as shown in FIG. 2).

FIG. 8 is a diagram identifying components of an aircraft hybrid-electric propulsion system 8 with a parallel hybrid architecture that includes an EMCU 2 configured to guide propulsion and power device controllers for optimal system operation. The multiple device controllers include the following: a battery controller 28 which controls operation of a battery 18; an engine controller 26a which controls operation of a turbine 14a; an engine controller 26a which controls operation of a turbine 14a; a motor controller 24a which controls operation of an electric motor 22a; and a motor controller 24b which controls operation of an electric motor 22b. The hybrid-electric propulsion system 8 further includes a pair of propellers 20a and 20b having respective shafts which are mechanically coupled to respective gearboxes 36a and 36b. The gearbox 36a is mechanically coupled to turbine 14a and electric motor 22a; the gearbox 36b is mechanically coupled to turbine 14b and electric motor 22b. Although FIG. 8 shows propellers, the energy management control method proposed herein also works for turbofans.

The gearboxes 36a and 36b are passive devices. When the electric motor 22a is delivering mechanical power to the gearbox 36a, this situation is equivalent to having electrical power (from battery 18) assist the turbine 14a with generating propulsive force (i.e., generating thrust). By varying the gas turbine's throttle and the electrical motor's current, the EMCU 2 is able to vary the mixture of fuel versus battery power used for propulsion in a manner consistent with the optimized energy management plan.

The EMCU 2 is communicatively coupled to the battery controller, the engine controller, and the motor controller. In accordance with one proposed implementation, EMCU 2 comprises modules capable of executing an offline optimization routine and an online routine. The offline optimization routine is configured to generate an original energy management plan which is calculated to minimize estimated life-cycle operating costs for the vehicle during a mission. The online routine is configured to vary a mixture of fuel input to the turbine versus battery power used for driving rotation of the propeller in a manner consistent with the original energy management plan during an initial portion of the mission.

Optionally, the online routine is further configured to perform operations comprising: generating a modified energy management plan which is calculated to minimize estimated life-cycle operating costs for the vehicle; and varying the mixture of fuel input to the turbine versus battery power used for driving rotation of the propeller in a manner consistent with the modified energy management plan during a subsequent portion of the mission. The online routine may be further configured to accept pilot commands for making adjustments to the mixture.

FIG. 9 is a diagram identifying components of an aircraft hybrid-electric propulsion system 8 with a series-parallel hybrid architecture that includes an EMCU 2 configured to guide the propulsion and power controllers for optimal system operation. The system depicted in FIG. 9 includes all of the components depicted in FIG. 8 and two additional components: generators 12a and 12b. Generator 12a is mechanically coupled to turbine 14a; generator 12b is mechanically coupled to turbine 14b. Generator 12a provides electrical power to electric motor 22a; generator 12b provides electrical power to electric motor 22b. The EMCU 2 is configured to control the mixture of electrical power to be provided to each electric motor in accordance with the optimized energy management plan, as previously described with reference to FIG. 2. The EMCU 2 is further configured to vary the mixture of fuel versus battery power used for propulsion in accordance with the optimized energy management plan, as previously described with reference to FIG. 8.

The flowcharts and block diagrams in the different depicted embodiments illustrate the architecture, functionality, and operation of some possible implementations of apparatus and methods for optimally operating a hybrid-electric propulsion system by control of equipment dynamics. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

While devices and methods for optimally operating a hybrid-electric propulsion and power system have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular embodiments disclosed herein.

The energy management control unit and other controllers may include one or more modules which may be implemented using hardware or hardware in combination with software. For example, a module may be implemented using configurable hardware, a programmable device, or both. Configurable hardware may comprise hardware that is configurable to perform one or more functions of the controller. A programmable device may comprise any device that is programmable to implement one or more functions of the controller. For example, without limitation, the programmable device may comprise a central processing unit, a microprocessor, or a digital signal processor. The programmable device may be configured to run software or firmware in the form of program instructions to implement one or more functions of the controller. Program instructions may be stored in any appropriate non-transitory tangible computer-readable storage medium for execution by, or transfer to, the programmable device.

In particular, the modules disclosed herein are configured in accordance with logic that includes one or more of the algorithms disclosed herein. When the functionality of a module is performed in any part through software, the module can include a non-transitory tangible computer-readable storage medium. The methods disclosed above may employ streaming (or on-the-fly) calculations, in which case the module configured to perform those calculations is suitable for FPGA or ASIC or another hardware-based implementation.

The methods described and claimed herein may include steps encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A vehicle comprising an energy management control unit, first and second power sources, a propulsion system, and a power distribution system capable of selectively providing power to the propulsion system from one or both of the first and second power sources, wherein the energy management control unit comprises modules capable of executing:
    an offline optimization routine that is configured to generate an original energy management plan which is calculated to minimize estimated life-cycle operating costs for the vehicle during a mission; and
    an online routine that is configured to control operations of the first and second power sources, the power distribution system, and the propulsion system during an initial portion of the mission such that a power mixture is supplied to the propulsion system from the first and second power sources in accordance with the original energy management plan,
    wherein generating the original energy management plan comprises:
    selecting respective amounts of energy drawn from the first and second power sources to reduce overall operating costs; and
    choosing equipment operating points that result in a minimum airplane-related operating cost;
    wherein the offline optimization routine is configured to ensure that the first and second power sources operate within safe envelopes by computing control signals that ensure values of device parameters remain within known safe ranges by use of dynamic models of device performance; and
    wherein the dynamic models are formulated as systems of algebraic-differential equations in terms of unknown state and control variables and are used to formulate and solve an optimal control problem, the solution being a set of control values for the first and second power sources over time.

2. The vehicle as recited in claim 1, wherein the estimated life-cycle operating costs include fuel costs, charging costs, maintenance costs, and replacement costs.

3. The vehicle as recited in claim 1, further comprising a flight management system which is communicatively coupled to the energy management control unit, wherein the offline optimization routine is configured to generate the original energy management plan which takes into account flight trajectory data received from the flight management system.

4. The vehicle as recited in claim 1, wherein the online routine is further configured to perform operations comprising:
    generating a modified energy management plan which is calculated to minimize the estimated life-cycle operating costs for the vehicle; and
    controlling operations of the first and second power sources, the power distribution system, and the propulsion system during a subsequent portion of the mission such that a power mixture is supplied to the propulsion system from the first and second power sources in accordance with the modified energy management plan.

5. The vehicle as recited in claim 4, wherein the online routine is further configured to accept pilot commands for making power-mix adjustments.

6. The vehicle as recited in claim 4, wherein the online routine is further configured to adapt to real-time changes by updating the dynamic models of device performance.

7. The vehicle as recited in claim 1, wherein the first power source is a turbine and the second power source is a battery, the vehicle further comprising a generator which is mechanically linked to the turbine and electrically connected to the power distribution system.

8. The vehicle as recited in claim 7, further comprising:
a battery controller which is communicatively coupled to the energy management control unit and the battery; and
an engine controller which is communicatively coupled to the energy management control unit and the turbine.

9. The vehicle as recited in claim 8, wherein the propulsion unit comprises:
a motor controller which is electrically connected to the energy management control unit and to the power distribution system;
an electric motor which is electrically connected to the motor controller; and
a propeller which is mechanically linked to the electric motor.

10. An aircraft hybrid-electric propulsion system comprising:
a battery;
a battery controller which is configured to control operation of the battery;
a turbine;
an engine controller which is configured to control operation of the turbine;
an electric motor;
a motor controller which is electrically coupled to the battery and configured to control operation of the electric motor;
a gearbox which is mechanically coupled to the turbine and the electric motor;
a propeller which is mechanically coupled to the gearbox; and
an energy management control unit which is communicatively coupled to the battery controller, the engine controller, and the motor controller, wherein the energy management control unit comprises modules capable of executing:
an offline optimization routine that is configured to generate an original energy management plan which is calculated to minimize estimated life-cycle operating costs for an aircraft during a mission; and
an online routine that is configured to vary a mixture of fuel input to the turbine versus battery power used for driving rotation of the propeller in a manner consistent with the original energy management plan during an initial portion of the mission,
wherein the offline optimization routine is configured to ensure that the battery and the electric motor operate within safe envelopes by computing control signals that ensure values of associated device parameters remain within known safe ranges by use of dynamic models of device performance; and
wherein the dynamic models are formulated as systems of algebraic-differential equations in terms of unknown state and control variables and are used to formulate and solve an optimal control problem, the solution being a set of control values for the battery and the electric motor over time.

11. The system as recited in claim 10, wherein the estimated life-cycle operating costs include fuel costs, charging costs, maintenance costs, and replacement costs.

12. The system as recited in claim 10, wherein the online routine is further configured to perform operations comprising:
generating a modified energy management plan which is calculated to minimize the estimated life-cycle operating costs for the aircraft; and
varying the mixture of fuel input to the turbine versus battery power used for driving rotation of the propeller in a manner consistent with the modified energy management plan during a subsequent portion of the mission.

13. The system as recited in claim 10, wherein the online routine is further configured to accept pilot commands for making adjustments to the mixture.

14. A computer-implemented method for optimally operating a hybrid-electric propulsion system by control of equipment dynamics, the method comprising:
prior to a start of a mission, generating an original energy management plan which is calculated to minimize estimated life-cycle operating costs for a vehicle during the mission;
computing control signals that ensure values of device parameters remain within known safe ranges by use of dynamic models of device performance; and
during an initial portion of the mission, using the control signals to control operations of first and second power sources, a power distribution system, and a propulsion system such that a power mixture is supplied to the propulsion system from the first and second power sources in accordance with the original energy management plan,
wherein the dynamic models are formulated as systems of algebraic-differential equations in terms of unknown state and control variables and are used to formulate and solve an optimal control problem, the solution being a set of control values for the first and second power sources over time.

15. The computer-implemented method as recited in claim 14, wherein the estimated life-cycle operating costs include fuel costs, charging costs, maintenance costs, and replacement costs.

16. The computer-implemented method as recited in claim 14, wherein generating the original energy management plan comprises:
selecting respective amounts of energy drawn from the first and second power sources to reduce overall operating costs; and
choosing equipment operating points that result in a minimum airplane-related operating cost.

17. The computer-implemented method as recited in claim 14, further comprising:
during the initial portion of the mission, generating a modified energy management plan which is calculated to minimize estimated life-cycle operating costs for the vehicle; and
during a subsequent portion of the mission, controlling operations of the first and second power sources, the power distribution system, and the propulsion system such that a power mixture is supplied to the propulsion system from the first and second power sources in accordance with the modified energy management plan.

* * * * *